United States Patent
Katayama et al.

(10) Patent No.: US 6,543,785 B1
(45) Date of Patent: Apr. 8, 2003

(54) PACKING STRUCTURE

(75) Inventors: Kazutaka Katayama, Komaki (JP); Hidehito Ikeda, Kasugai (JP); Tetsuji Narasaki, Komaki (JP); Koji Senda, Aichi-ken (JP)

(73) Assignee: Tokai Rubber Industries, Ltd., Komaki (JP)

( * ) Notice: Subject to any disclaimer, the term of this patent is extended or adjusted under 35 U.S.C. 154(b) by 78 days.

(21) Appl. No.: 09/722,692

(22) Filed: Nov. 28, 2000

(30) Foreign Application Priority Data

Nov. 30, 1999 (JP) ............................................. 11-338891

(51) Int. Cl.⁷ ................................................. F16J 15/10
(52) U.S. Cl. ........................ 277/534; 277/627; 277/650; 277/652; 277/654; 277/935; 428/421; 428/422; 428/451; 428/517
(58) Field of Search ................................. 277/627, 650, 277/652, 654, 935, 936, 944, 945, 946, 534, 910; 428/421, 422, 451, 476.1, 476.9, 483, 518, 517, 521, 213, 335

(56) References Cited

U.S. PATENT DOCUMENTS

| | | | | |
|---|---|---|---|---|
| 3,549,156 A | * | 12/1970 | Vleet | 277/652 |
| 3,788,654 A | * | 1/1974 | Mandley | 277/434 |
| 4,292,222 A | * | 9/1981 | Grigo et al. | 524/269 |
| 4,434,123 A | * | 2/1984 | Katumi et al. | 264/225 |
| 4,547,312 A | * | 10/1985 | Graiver et al. | 252/512 |
| 5,240,983 A | * | 8/1993 | Tabata et al. | 264/211 |
| 5,464,659 A | * | 11/1995 | Melancon et al. | 427/387 |
| 5,484,560 A | * | 1/1996 | Moriyama et al. | 264/132 |
| 5,494,301 A | * | 2/1996 | Hamilton et al. | 277/652 |
| 5,551,707 A | * | 9/1996 | Pauley et al. | 277/654 |
| 5,667,227 A | * | 9/1997 | Boldt | 277/652 |
| 5,701,751 A | * | 12/1997 | Flores | 165/104.21 |
| 6,053,171 A | * | 4/2000 | Stewart et al. | 128/897 |
| 6,189,322 B1 | * | 2/2001 | Ishihara et al. | 62/114 |
| 6,316,137 B1 | * | 11/2001 | Kralick | 429/34 |
| 2002/0106526 A1 | * | 8/2002 | Kuramoto et al. | 428/520 |

OTHER PUBLICATIONS

Charles Harper (Editor–In–Chief), Chapter 3 "Elastomeric Materials and Processes" Modern Plastics handbook copyright 2000, McGraw–Hill.*

* cited by examiner

*Primary Examiner*—Anthony Knight
(74) *Attorney, Agent, or Firm*—Jacobson Holman PLLC

(57) ABSTRACT

A packing structure has a core element of a material having a high fluid impermeability, and a thin coated rubber layer formed thereon to cover at least its sealing surface and having a glass transition temperature which is lower than the lowest temperature allowable for the packing structure. It shows a high sealing property even at a low temperature and a high fluid impermeability when used for sealing e.g. a pipeline for conveying fuel in a motor vehicle.

17 Claims, 2 Drawing Sheets

PRIOR ART

PACKING STRUCTURE

BACKGROUND OF THE INVENTION

1. Field of the Invention

This invention relates to a packing structure for sealing a joint in a pipeline for conveying various kinds of refrigerant gas such as freon or carbon dioxide, or a volatile liquid such as gasoline, or hydrogen or oxygen for a fuel cell. More particularly, it relates to a packing structure to get the compatibility between a reliable seal even at a low temperature and excellent barrier properties (impermeability) to a refrigerant gas and a volatile liquid.

2. Description of the Related Art

An annular packing member such as an O-ring, or a plane packing member is usually used for sealing a joint in a pipeline for conveying various kinds of fluids. The packing has usually been a molded and cured product of a material having resistance to any such fluid. For example, the packing for sealing a fuel pipeline, such as for gasoline, has been properly and selectively made of fluororubber (FKM), fluorosilicone rubber (FVMQ), nitrile rubber (NBR), hydrogenated nitrile rubber (H-NBR), a mixture of acrylonitrile-butadiene rubber and polyvinyl chloride (NBR-PVC) or a mixture of FKM and FVMQ, and the packing for sealing an oil pipeline, such as for lubricant oil, has been properly and selectively made of acrylic rubber (ACM) or silicone rubber (Q) in addition to any such rubber.

If the pipeline is for a fluid used in a motor vehicle, the packing is required to maintain its sealing property even at a considerably low temperature, since the vehicle is likely to go to a very cold place. It has, however, been found that the ones which have excellent barrier properties among the known packing materials harden at a low temperature and fail to form a reliable seal at a low temperature because of an unevenness on metal or resin joint surface.

A metal joint 1 usually has an uneven surface with very small concavities 2 even if it may have been accurately finished, as shown in FIG. 1A. A resin joint also has a similar uneven surface due to the shrinkage which may occur during its injection molding. The concavities 2 form paths for fluid leakage between the joint and a packing member 3, such as an O-ring, though they are usually closed when the packing member 3 is deformed in the directions of an arrow y by a fluid pressure bearing upon it in the directions of an arrow x, as shown in FIG. 1B. The packing member 3, however, fails to form a reliable seal at a low temperature not reaching the glass transition point of its material, since it becomes too hard to be satisfactorily deformed to close the paths completely, as is obvious from FIG. 1C. These drawbacks are particularly remarkable when packing materials are FKM, H-NBR or the like having excellent barrier properties.

In the case that the fluid is a refrigerant gas or a volatile liquid such as gasoline, the packing is required to be highly impermeable to a refrigerant gas and a volatile liquid from the point of view of requirement of supplying no refrigerant gas into a cooler system and of preventing any freon gas, or gasoline from flowing out into the environment. It has, however, been found that the known packing materials with a good seal even at a low temperature, are not satisfactory in fluid impermeability. For example, the use of packing materials having rubber elasticity even at a low temperature (e.g. FVMQ or NBR) prevents loss of a seal at a low temperature, but fails to provide good fluid impermeability.

SUMMARY OF THE INVENTION

Thus, there is not known any packing material that can form a good seal even at a low temperature and is highly impermeable to any refrigerant gas, or volatile liquid.

It is, therefore, an object of this invention to provide a packing structure which can form a reliable seal even at a low temperature and is highly impermeable to any such fluid.

According to a first aspect of this invention, packing structure comprises a core element which is highly impermeable to a refrigerant gas, or volatile liquid, and a thin coated rubber layer formed on the core element and having a glass transition temperature lower than the lowest temperature at which the packing structure can be used (up to −35° C.).

The core element is satisfactorily impermeable to any such fluid for preventing it from flowing out through the packing structure, and the rubber layer formed thereon ensures the maintenance of a reliable seal even at a low temperature, since it retains rubber elasticity even at the lowest temperature that is allowable for the structure. Even if the impermeability of the rubber layer to a volatile liquid is insufficient, it hardly affects the fluid impermeability of the packing structure as a whole, since the core element having excellent barrier properties occupies the greater part of the overall thickness of the structure. Moreover, the rubber layer is deformable to fit even a rough metal or resin joint surface closely to form a tight seal.

According to a second aspect of this invention, the packing structure is used for sealing a pipeline in a motor vehicle, and its rubber layer has a loss modulus (E") showing a peak at a temperature not exceeding −35° C., and a storage modulus (E') not exceeding $2 \times 10^{10}$ dyn/cm$^2$ at −35° C. The rubber layer has a sufficiently low glass transition temperature and a sufficiently high flexibility at a low temperature to make the packing structure suitable for use with a fuel pipeline in a motor vehicle.

According to a third aspect of this invention, the rubber layer has a thickness of 4 to 50 µm. Its thickness as stated is sufficiently large to close any concavities existing on a surface of a joint metal, and is sufficiently small not to affect the fluid impermeability of the packing structure as a whole. The inventors of this invention have found that such concavities usually have a depth of, say, 0.1 to 3 µm and not exceeding 10 µm in a mechanically finished metal joint surface, or a depth not exceeding, say, 12 µm in an injection molded resin joint surface having shrinkage, or a surface made uneven by the separation of a coating layer. The fluid impermeability of the packing structure as a whole depends on the material and thickness (or diameter) of its core element and the material and thickness of its rubber layer. The inventors have found that the packing structure has a satisfactorily high fluid impermeability as a whole if its rubber layer has a thickness occupying, say, 0.2 to 2.5% of the thickness of its core element. If the core element has a diameter of 2 mm which is common to any packing member used in a fuel pipeline, it follows that it is desirable for the rubber layer to have a thickness of 4 to 50 µm. This range of layer thickness has been found to be sufficiently large to fill the depth of concavities and unevenness as mentioned above.

According to a fourth asepct of this invention, the core element is of a cured product of fluororubber (FKM), hydrogenated nitrile rubber (H-NBR) or a mixture of acrylonitrile-butadiene rubber and polyvinyl chloride (NBR-PVC), or a fluoro, polyamide or polyester resin having a melting point at a temperature not lower than 140° C., and the rubber layer is of epichlorohydrin rubber (ECO), nitrile rubber (NBR), low nitrile H-NBR, chloroprene rubber (CR), urethane rubber (U), fluorosilicone rubber (FVMQ), chlorosulfonated polyethylene rubber (CSM), chlorinated polyethylene rubber (CPE), chlorinated butyl rubber (Cl-IIR), brominated butyl rubber (Br-IIR), acrylic rubber (ACM), a mixture (NE) of NBR and an ethylene-propylene-diene terpolymer (EPDM), or ethylene-propylene rubber (EPR). The core element as set forth is of rubber having a particularly high level of impermeability to a fuel, or like fluid, or a resin having a melting point at a temperature not lower than 140° C. The resin is comparable or even superior to fluororubber in fluid impermeability, is high in toughness, and is even more flexible at a low temperature than fluororubber having a higher temperature dependence of flexibility. The rubber layer as set forth is of rubber having a particularly good sealing property at a low temperature and adhering closely to the core element so that no separation thereof resulting in a broken seal may occur.

Therefore, the effect of the first or second aspect of the invention is especially clear in the fourth aspect of the invention to prevent effectively the loss of the seal by the separation between the core element and the coating rubber.

According to a fifth aspect of this invention, the core element and the rubber layer are directly cured under heat to adhere to each other. They adhere to each other without the aid of any adhesive. Their adhesion is stronger than when an adhesive is used, and their separation is less likely to occur. No peeling or shaving of the rubber layer is caused by the joint with which the packing structure is used.

According to a sixth aspect of this invention, the rubber layer has a surface resistivity not exceeding $10^6$ Ω/sq. There has been recently an increasing demand for e.g. a fuel pipeline which is not electrically charged. However, it has been difficult to add a satisfactorily large amount of an electrically conductive material to any known packing formed of a single material, such as fluororubber or a resin. The addition of an electrically conductive material may make fluororubber much less easy to work upon to form e.g. an O-ring and may yield a product which is too hard to make an effective seal and be satisfactory in mechanical properties. The rubber layer on the packing structure of this invention is, however, easy to make electrically conductive to the extent that it may have a surface resistivity not exceeding, say, $10^6$ Ω/sq. That level of electrical conductivity is sufficient for preventing a pipeline from being electrically charged, and can be achieved without the sacrifice of the sealing or other properties of the packing structure, since the core element is principally responsible for its fluid impermeability, while the rubber layer serves as an electrical conductor.

The above and other advantages of this invention will become more apparent from the following description and the accompanying drawings.

DETAILED DESCRIPTION OF THE INVENTION

The invention will now be described in further detail by way of a number of preferred embodiments and specific examples.
(Use of the Packing Structure)

The packing structure of this invention can be used without limitation for sealing a pipeline for conveying a refrigerant gas, or volatile liquid. It is particularly suitable for use in sealing a pipeline for conveying a freon as a refrigerant, or a volatile fuel like gasoline to prevent any such fluid from flowing out or volatilizing into the environment, or in sealing a pipeline for conveying carbon dioxide as a refrigerant in which high impermeability is required to dispense with the supplement of refrigerant.

The packing structure is also suitable for use with a pipeline for conveying, for example, hydrogen, oxygen, natural gas, or liquid or gaseous methanol for a fuel cell. It is also suitable for use with a cooler hose of the so-called coming generation for conveying propane, as well as carbon dioxide. It can also be used with a pipeline for conveying a different fluid, though it may not fully manifest the advantages of this invention when used with a pipeline for conveying, for example, a lubricant oil.
(Construction)

The packing structure of this invention may be of any shape as required by its specific application and fitting the shape of e.g. a joint to be sealed, though its typical forms may be an annular one such as an O-ring, or a plane one. The packing structure has a core element defining its overall shape and a thin layered coating rubber formed on the core element for coating at least its sealing surface or surfaces facing the end or ends of a pipe or pipes in a joint to be sealed.

Figure 1A:
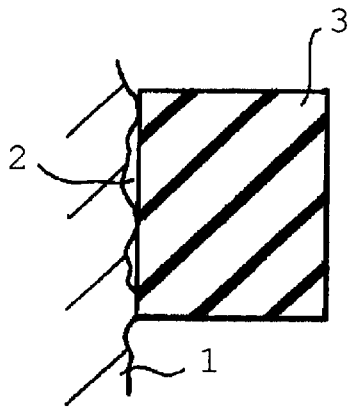
FIGS. 1A to 1C are a set of fragmentary cross-sectional views showing that a known packing member fails to form a reliable seal at a low temperature.
Figure 1B:
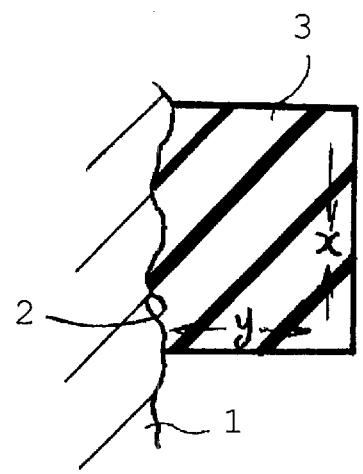
Figure 1C:
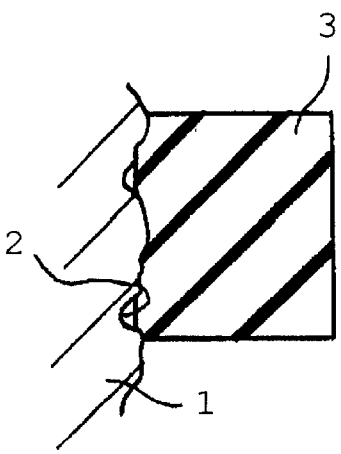
Figure 2A:
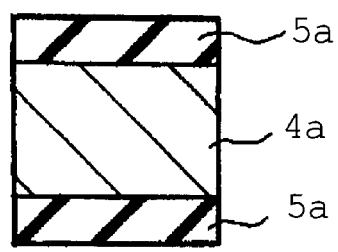
FIGS. 2A to 2D are each a cross-sectional view of a packing structure embodying this invention.
Figure 2B:
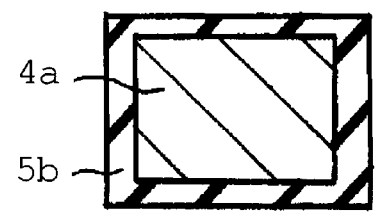
Figure 2C:
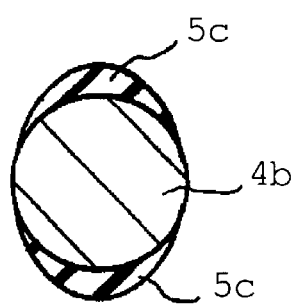
Figure 2D:
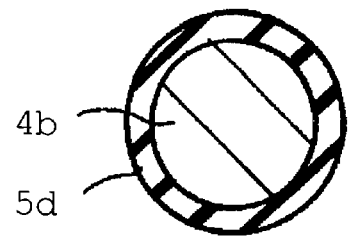

Reference is made to FIGS. 2A to 2D illustrating some examples of construction embodying this invention. Each of FIGS. 2A to 2D is a cross-sectional view of an annular packing structure having a sealing surface at its top. FIG. 2A shows a core element 4a having a rectangular cross section and two layers of rubber 5a covering the top and bottom surfaces, respectively, of the core element 4a. FIG. 2B shows a core element 4a having a rectangular cross section and a layer of rubber 5b covering the whole surfaces of the core element 4a. FIG. 2C shows a core element 4b having a circular cross section and two layers of rubber 5c covering the top and bottom portions, respectively, of the peripheral surface of the core element 4b. FIG. 2D shows a core element 4b having a circular cross section and a layer of rubber 5d covering the whole peripheral surface of the core element 4b.

Although any appropriate means, including the use of an adhesive, can be employed for causing the rubber layer (or layers) to adhere to the core element, they are preferably caused to adhere to each other directly by curing under heat, as will later be described in further detail.
(Core Element)

The core element is preferably of a material which is highly impermeable to any refrigerant gas, or volatile liquid. Examples of the preferred materials are various kinds of rubber including fluororubber (FKM), fluorosilicone rubber (FVMQ), nitrile rubber (NBR), hydrogenated nitrile rubber (H-NBR), a mixture of acrylontrile-butadiene rubber and polyvinyl chloride (NBR-PVC), a mixture of FKM and FVMQ, acrylic rubber (ACM), and silicone rubber (Q). The most preferable rubber is fluororubber, and particularly a binary type of fluororubber, such as vinylidene fluoride-hexafluoropropylene rubber (VDF-HFP), tetrafluoroethylene-propylene rubber or tetrafluoroethylene perfluoromethyl vinyl ether rubber, or a ternary type of fluororubber, such as vinylidene fluoride-hexafluoropropylene-tetrafluoroethylene (VDF-HFP-TFE) rubber.

Other examples of the preferred materials are various kinds of crystalline resins having a melting point at a temperature of 140° C. or above, including, among others, fluororesins such as tetrafluoroethylene-hexafluoropropylene-vinylidene fluoride (THV), polytetrafluoroethylene (PTFE), a tetrafluoroethylene-perfluoroalkoxy ether copolymer (PFA), a tetrafluoroethylene-hexafluoropropylene copolymer (FEP), an ethyne-tetrafluoroethylene copolymer (ETFE) and polyvinylidene fluoride (PVDF), polyamide resins such as PA6T, PA6, PA11 and PA12, and polyester resins such as polybutylene terephthalate (PBT) and polyethylene terephthalate (PET), which are all high in moldability and fluid impermeability. The most preferable resins include THV, PTFE, PFA, FEP, ETFE, PA11, PA12 and PBT.

The core element may have a thickness or diameter which can be selected as required and does not basically differ from that of any known packing member.

(Rubber Layer)

The rubber layer is preferably of rubber having a glass transition temperature which is lower than the lowest temperature allowable for the packing structure, or more specifically, rubber having the peak of its loss modulus (E") at a temperature not exceeding −35° C. and a storage modulus (E') not exceeding $2 \times 10^{10}$ dyn/cm$^2$ at −35° C. Specific examples are styrene-butadiene rubber (SBR), butadiene rubber (BR), isoprene rubber (IR), natural rubber (NR), low-nitrile NBR, ethylene-propylene-diene rubber (EPDM), butyl rubber (IIR), silicone rubber (Q) and phosphonitrilefluororubber (PNF). According to the fourth aspect of this invention, the layer is preferably of epichlorohydrin rubber (ECO), nitrile rubber (NBR), chloroprene rubber (CR), urethane rubber (U), fluorosilicone rubber (FVMQ), hydrogenated nitrile rubber (H-NBR), chlorosulfonated polyethylene rubber (CSM), chlorinated polyethylene rubber (CPE), chlorinated butyl rubber (CI-IIR), brominated butyl rubber (Br-IIR), acrylic rubber (ACM), a mixture (NE) of NBR and an ethylene-propylene-diene terpolymer (EPDM), or ethylene-propylene rubber (EPR).

The rubber layer is small in thickness, but if its thickness is too small, the packing structure may not form a reliable seal at a low temperature. If its thickness is too large, the packing structure may not be satisfactory in fluid impermeability, and may not be high in dimensional accuracy. Thus, the layer preferably has a thickness falling within the range of 4 to 50 μm, and more preferably equal to 0.2 to 2.5% of the thickness of the core element.

(Manufacture)

Any known process can be employed for making the core element and forming the rubber layer thereon to obtain the packing structure of this invention. A useful process may, for example, include forming a layer of liquid rubber having an adequate thickness by dipping or coating on the whole surface of a molded core element of semi-cured or cured rubber, or resin, or on a part thereof including at least its sealing surface, drying it and curing it. This process does not require any separate step, or any adhesive for causing the rubber layer to adhere to the core element, but can cause them to adhere to each other directly and very firmly by curing under heat. If the core element is molded from a resin such as a fluororesin, the molded product having an appropriate sectional shape is subjected to plasma, corona discharge, or surface treatment by sodium before a rubber layer is formed thereon, exposed to hot air, and press cured with vapor, so that the layer may adhere to the core element firmly.

EXAMPLES

A set of samples of packing structures embodying this invention were prepared as Examples 1 to 9 and are shown in Table 1 below, while Table 2 shows Comparative Examples 1 to 4. Each sample was an O-ring having a core element molded from the material shown in Table 1 or 2 and having an inside ring diameter of 7.6 mm and a sectional diameter of 2 mm (or 1.65 mm in the case of Example 7). The "Ternary FKM" shown as the core element material is vinylidene fluoride-hexafluoropropylene-tetrafluoroethylene rubber and the "Binary FKM" is vinylidene fluoride-hexafluoropropylene rubber.

After its plasma surface treatment if "given" is indicated, and without such treatment if "−" is indicated in Table 1 or 2, the core element for each sample embodying this invention was coated with a layer of rubber covering its whole peripheral surface, as shown in FIG. 2D. More specifically, a coating solution containing 90% by weight of toluene and 10% by weight of the coating rubber as shown in Table 1 (or 80% by weight of methyl ethyl ketone and 20% by weight of rubber in Example 5) was applied onto the core element, and dried to form a rubber layer having the thickness as shown in Table 1. Then, vapor curing was performed at 160° C. for 45 minutes in Examples 1, 2, 4 and 6 to 9, at 150° C. for 30 minutes in Example 3, and at 165° C. for 20 minutes in Example 5 to make each packing structure embodying this invention.

[Fuel Permeability Test]

Each O-ring having a sectional diameter of 2 mm and an inside ring diameter of 11 mm was fitted to a metallic connector, and a resin ring was fitted to hold the O-ring in position. Two such connectors were fitted in the opposite ends, respectively, of a resin tube. The connectors were so arranged that the resin tube might not have any portion contacted by a test liquid contacting the connectors. A metal pipe having an outside diameter of 8 mm and closed tightly at one end was securely inserted at the other end into one of the connectors. A metal pipe connected at one end to a metallic tank was securely inserted at the other end into the other connector. The tank was charged with 100 cc of test gasoline (Fuel C) reaching the connectors, and the whole was left to stand at a temperature of 40° C. for a week. Then, the tank was charged with new test gasoline, and weighed, and the whole was left to stand at a temperature of 40° C. for another week. Then, the tank was weighed again so accurately that even a difference of 1 mg from its initial weight could be determined as a measure for the amount of the gasoline which had permeated. The result is shown in Table 1 or 2 by a value relative to the value of 1 taken to indicate the result exhibited by the O-ring consisting of the binary type fluororubber in Comparative Example 1.

[Cold Sealing Test]

Each O-ring to be tested was fitted between a metallic connector and a pipe having concavities made in its surface with a depth of 30 μm. Regular gasoline was introduced into the pipe, and its pressure was raised to 5 kgf/cm$^2$ at a temperature of −30° C. Then, the O-ring was examined for any blot made by the leakage of gasoline therethrough. The result is shown in Table 1 or 2.

[Dynamic Viscoelasticity Test—Loss Modulus (E")]

A sheet having a thickness of 2 mm was formed from the coating rubber used in each Example (or the core element material in each Comparative Example) to prepare a test specimen. The temperature at which each specimen showed the peak of its loss modulus (E") was measured by using Rheospectra® DVE-V4 FT of Rheology Co., Ltd. under the conditions including 10 Hz and 10 μm. The result is shown in Table 1 or 2.

[Surface Resistivity]

The surface resistivity (Ω/sq.) of each such sheet was measured in accordance with the ASTM D257 method. The result is shown in Table 1 or 2.

TABLE 1

| Example | 1 | 2 | 3 | 4 | 5 | 6 | 7 | 8 | 9 |
|---|---|---|---|---|---|---|---|---|---|
| Core element material | Ternary FKM | Ternary FKM | Ternary FKM | Ternary FKM | Ternary FKM | Binary FKM | PTFE | Ternary FKM | Ternary FKM |
| Surface treatment | — | — | — | — | — | Given | Given | Given | Given |
| Coating rubber | ECO | NBR | CR | U | FVMQ | ECO | ECO | ECO | H-NBR |
| Rubber layer thickness (μm) | 30 | 40 | 35 | 20 | 5 | 30 | 30 | 30 | 40 |
| a. Fuel permeability (relative to that of binary FKM) | 0.9–1.2 | 1.0–1.1 | 0.9–1.3 | 1.0–1.3 | 1.0–1.4 | 1.0–1.4 | 0.7–0.9 | 0.9–1.2 | 0.9–1.2 |
| b. Cold sealing | No blot found | No blot found | No blot found | No blot found | No blot found | No blot found | No blot found | No blot found | No blot found |
| c. Temp. at which rubber layer showed the peak of its loss modulus (° C.) | −57 | −42 | −43 | −40 | −82 | −57 | −57 | −57 | −42 |
| Its storage modulus (dyn/cm$^2$) | $3.3 \times 10^9$ | $1.2 \times 10^{10}$ | $8.0 \times 10^9$ | $8.3 \times 10^9$ | $6.7 \times 10^8$ | $3.3 \times 10^9$ | $3.3 \times 10^9$ | $3.3 \times 10^9$ | $7.7 \times 10^9$ |
| d. Surface resistivity (Ω/sq.) | $10^4$ | $10^5$ | $10^5$ | $10^5$ | $10^4$ | $10^4$ | $10^4$ | $10^4$ | $10^5$ |

TABLE 2

| Comparative Example | 1 | 2 | 3 | 4 |
|---|---|---|---|---|
| Core element material | Binary FKM | Ternary FKM | GLT | FKM/FVMQ |
| Surface treatment | — | — | — | — |
| Coating material | — | — | — | — |
| a. Fuel permeability (relative to that of binary FKM) | 1 | 0.8 | 3 | 15 |
| b. Cold seating | Bleed found | Blot found | No blot found | No blot found |
| c. Temp. at which the core element material showed the peak of its loss modulus (° C.) | −16 | −6 | −32 | −83, −18 |
| Its storage modulus (dyn/cm$^2$) | $3.0 \times 10^{10}$ | $3.0 \times 10^{10}$ | $2.3 \times 10^{10}$ | $1.1 \times 10^{10}$ |
| d. Surface resistivity (Ω/sq.) | $10^{11}$ | $10^{11}$ | $10^{11}$ | $10^{12}$ |

While the invention has been described by way of its preferred embodiments, it is to be understood that variations or modifications may be easily made by those skilled in the art without departing from the scope of this invention which is defined by the appended claims.

What is claimed is:

1. A packing structure comprising:
   a core element of rubber material which is highly impermeable to a refrigerant gas or volatile liquid; and
   a thin coated rubber layer on the core element and having a glass transition temperature lower than the lowest temperature at which the packing structure can be used;
   wherein the rubber layer covers a whole surface of the core element and is cure bonded to said core element.

2. A packing structure according to claim 1, which is adapted to be used for sealing a pipe for a refrigerant gas or volatile liquid.

3. A packing structure according to claim 2, wherein the refrigerant gas is a freon or carbon dioxide refrigerant, and the volatile liquid is a gasoline.

4. A packing structure according to claim 1, wherein the packing structure is of an annular or plane shape.

5. A packing structure according to claim 1, wherein the rubber layer is formed on the core element of a resin subjected to plasma or corona treatment, or surface treatment by sodium.

6. A packing structure according to claim 1, wherein the rubber layer has a thickness of 4 to 50 μm.

7. A packing structure according to claim 1, wherein the rubber layer has a thickness of 0.2 to 2.5% of the thickness of the core element.

8. A packing structure according to claim 1, wherein the core element is of a material selected from the group consisting of fluororubber (FKM), fluorosilicone rubber (FVMQ), nitrile rubber (NBR), hydrogenated nitrile rubber (H-NBR), a mixture of acrylontrile-butadiene rubber and polyvinyl chloride (NBR-PVC), a mixture of FKM and FVMQ, acrylic rubber (ACM), and silicone rubber (Q).

9. A packing structure according to claim 8, wherein the FKM is selected from the group consisting of vinylidene fluoride-hexafluoropropylene rubber (VDF-HFP), tetrafluoroethylene-propylene rubber, tetrafluoroethylene perfluoromethyl vinyl ether rubber, and vinylidene fluoride-hexafluoropropylene-tetrafluoroethylene (VDF-HFP-TFE) rubber.

10. A packing structure according to claim 1, wherein the core element is of a crystalline resin having a melting point at a temperature not lower than 140° C.

11. A packing structure according to claim 10, wherein the crystalline resin is selected from the group consisting of tetrafluoroethylene-hexafluoropropylene-vinylidene fluoride (THV), polytetrafluoroethylene (PTFE), a tetrafluoroethylene-perfluoroalkoxy ether copolymer (PFA), a tetrafluoroethylene-hexafluoropropylene copolymer (FEP), an ethyne-tetrafluoroethylene copolymer (ETFE), polyvinylidene fluoride (PVDF), polyamide (PA), polybutylene terephthalate (PBT), and polyethylene terephthalate (PET).

12. A packing structure according to claim 1, wherein the rubber layer has a loss modulus (E") showing a peak at a temperature not exceeding −35° C.

13. A packing structure according to claim 1, wherein the rubber layer has a storage modulus (E') not exceeding $2.0 \times 10^{10}$ dyn/cm$^2$ at −35° C.

14. A packing structure according to claim 1, wherein the rubber layer has a surface resistivity not exceeding $10^6$ Ω/sq.

15. A packing structure according to claim 1, wherein the rubber layer is of a material selected from the group consisting of styrene-butadiene rubber (SBR), butadiene rubber (BR), isoprene rubber (IR), natural rubber (NR), low-nitrile rubber (NBR), ethylene-propylene-diene rubber (EPDM), butyl rubber (IIR), silicone rubber (Q), and phosphonitrile-fluororubber (PNF).

16. A packing structure according to claim 1, wherein the rubber layer is of a material selected from the group consisting of epichlorohydrin rubber (ECO), nitrile rubber (NBR), chloroprene rubber (CR), urethane rubber (U), fluorosilicone rubber (FVMQ), hydrogenated nitrile rubber (H-NBR), chlorosulfonated polyethylene rubber (CSM), chlorinated polyethylene rubber (CPE), chlorinated butyl rubber (CI-IIR), brominated butyl rubber (Br-IIR), acrylic rubber (ACM), a mixture (NE) of NBR and an ethylene-propylene-diene terpolymer (EPDM), and ethylene-propylene rubber (EPR).

17. A packing structure comprising a combination of:
   a core element of rubber material which is highly impermeable to a refrigerant gas or volatile liquid; and
   a thin coated rubber layer on the core element and having a glass transition temperature lower than the lowest temperature at which the packing structure can be used;
   wherein the combination is a cured product of a) a liquid rubber layer covering an entire surface of b) the core element in semi-cured rubber form.

* * * * *